United States Patent [19]

Geisthoff

[11] Patent Number: 4,460,077
[45] Date of Patent: Jul. 17, 1984

[54] OVERLOAD CLUTCH ASSEMBLY

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 300,596

[22] Filed: Sep. 9, 1981

[30] Foreign Application Priority Data

Sep. 13, 1980 [DE] Fed. Rep. of Germany ....... 3034606

[51] Int. Cl.³ .............................................. F16D 7/02
[52] U.S. Cl. .................................. 192/56 R; 192/24; 192/27; 192/28; 464/38
[58] Field of Search ............... 192/26, 28, 33 R, 56 R, 192/27, 24; 464/37, 38, 35, 36

[56] References Cited

U.S. PATENT DOCUMENTS 1,088,723  3/1914  Rathsam ................................ 192/28
3,245,230  4/1966  Denzin ................................ 192/56 R
3,406,797  10/1968  Toussaint ............................. 192/27
4,075,873  2/1978  Geisthoff ...................... 192/56 R X
4,294,340  10/1981  Kunze ................................ 192/56 R

FOREIGN PATENT DOCUMENTS 1466380  3/1977  United Kingdom .

Primary Examiner—Rodney H. Bonck
Assistant Examiner—James J. Merek
Attorney, Agent, or Firm—Toren, McGeady and Stanger

[57] ABSTRACT

An overload clutch assembly including a driving member and a driven member having torque transmitting balls operatively disposed therebetween in apertures in the driving member and engageable in recesses in the driven member with a control member axially spring biased to hold the balls in the recesses in the driven member to effect the engaged condition of the clutch. The control member is circumferentially movable relative to the driving member against the action of biasing springs to bring recesses in the control member into alignment with the torque transmitting members so that the clutch assembly can be moved to the disengaged condition. The control member includes a first radially outwardly extending cam which is engageable by a radially movable external control tappet to cause circumferential movement of the control member for bringing the clutch into the disengaged condition when required other than in response to torque overload. The driving member includes a second cam operative to move the control tappet radially out of the path of the first cam whereby the clutch assembly is in condition to effect re-engagement.

7 Claims, 2 Drawing Figures

OVERLOAD CLUTCH ASSEMBLY

The present invention relates generally to an overload clutch assembly and more particularly to a clutch assembly of the type wherein torque transmitting balls may be operatively moved for effecting clutch transmitting engagement and disengagement of the clutch assembly.

An overload clutch assembly of the type to which the present invention refers is described in British Patent Application No. 7942173 (2036890A).

A clutch of the type specified operates upon overload to be brought to a disengaged or freewheeling condition wherein the clutch operates either to transmit no torque or at least a greatly reduced torque. In such a clutch there is however no means for bringing the clutch into this condition other than be overload of the clutch.

An arrangement wherein an overload clutch is connected to a control device is disclosed in FIG. 5 of British Patent Specification No. 1466380. Torque transmitting elements in the form of balls are outwardly biased by a conical end portion of a spring loaded rod. The rod may be withdrawn against the force of its spring loading by an operating lever when the clutch is to be disengaged. Alternatively, withdrawal of the rod may be controlled by a solenoid or cylinder.

A disadvantage of an arrangement of this type is that withdrawal of the rod to bring the clutch to its disengaged condition must be effected against the force of the torque holding spring. Thus, there will arise disproportionately high control forces.

The present invention is directed toward provision of an overload clutch which may be readily brought to the disengaged condition when required without the necessity for exerting excessive force and to a clutch which may be automatically re-engaged.

SUMMARY OF THE INVENTION

Briefly, the present invention may be described as an overload clutch assembly comprising a driving member, a driven member, a plurality of torque transmitting members operatively interposed between said driving and driven members, means on one of said driving and driven members defining a plurality of circumferentially spaced apertures for holding in operative position therein said plurality of torque transmitting members, means on the other of said driving and driven members defining a first plurality of circumferentially spaced recesses adapted to engage therein said torque transmitting members, a circumferentially movable control ring having formed therein a second plurality of circumferentially spaced recesses adapted to receive therein said torque transmitting members, spring means urging said control ring against said torque transmitting members, said control ring being operable by circumferential movement thereof to place said clutch assembly into torque transmitting engagement by urging said torque transmitting members into said first plurality of recesses and to effect disengagement of said clutch assembly by engagement of said torque transmitting members into said second plurality of recesses, first cam means on said control ring, second cam means on said driving member, and a control member radially movable into and out of position for engagement with said first cam means, said control member being operable to effect disengagement of said clutch assembly by radial movement thereof into engagement with said first cam means, with said second cam means operating upon engagement thereof with said control member to move said control member radially out of position for engagement with said first cam means.

Thus, in accordance with the present invention, there is provided an overload clutch assembly of the type described wherein the control ring is provided with an externally engageable formation by means of which, when in use, said circumferential movement thereof relative to said one clutch member may be effected to bring the clutch to its disengaged condition.

The advantage of an overload clutch of this type is that the force required to be exerted to disengage the clutch is determined merely by the further spring means which bias the control ring circumferentially relative to the clutch. The force of the spring which holds the torque transmitting elements in engagement with the driving and driven clutch members and the control ring does not need to be overcome. A further advantage is that, if there are several different drive lines derived from a single drive source, the overload clutch can take over the monitoring function of several individual clutches. Parameters other than torque, such as temperature, noise level, specific component loads, can be monitored to cause the clutch to disengage if operating conditions become unsafe.

Preferably, the formation of the control ring comprises a radially outwardly extending cam member having an abrupt or radially extending edge with which the radially movable external control member or tappet is engageable. The second cam means provided on the driving member may comprise a tapered cam member adapted to move the control member or tappet out of the range of the first cam means provided on the control ring, with both the first and the second cam means being in circumferential alignment when the clutch is in its torque transmitting condition. Thus, after the clutch has disengaged, the control tappet may be moved away from the control ring to return the clutch to a state in which it may re-engage after the overload has been removed and the speed reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
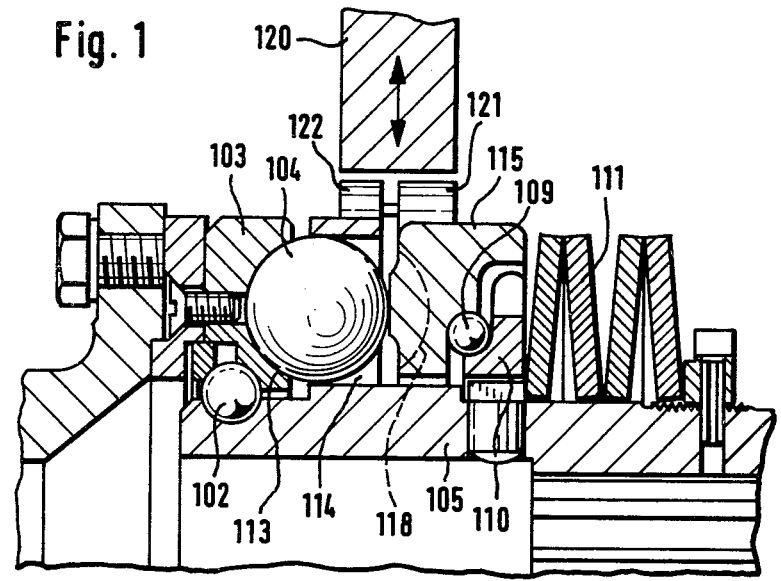
FIG. 1 is a sectional view of an overload clutch in accordance with the present invention.
Figure 2:
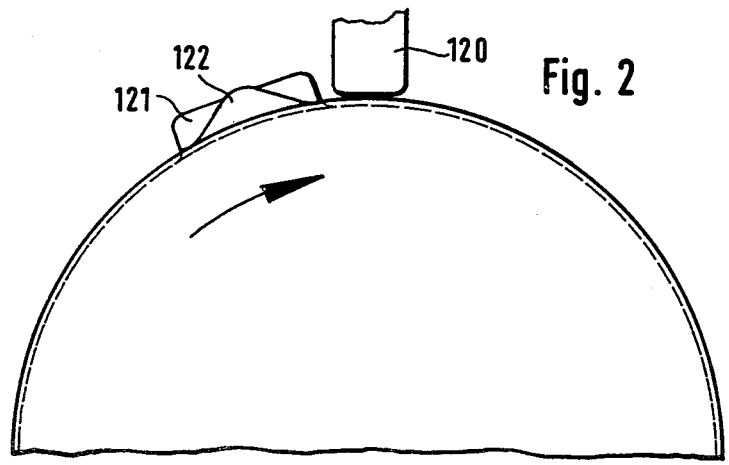
FIG. 2 is an end view of a part of the clutch shown in FIG. 1.

Referring now to the drawings, there is shown an overload clutch assembly in accordance with the present invention which comprises clutch members in the form of a hub 105 and a sleeve 103, with the sleeve 103 being supported relative to the hub 105 by a bearing 102. The sleeve 103 is connected to a universal joint yoke (not shown) and the hub 105 is formed with a radially outwardly extending flange provided with uniformly circumferentially spaced axially extending apertures 114 in which there are received a plurality of torque transmitting elements in the form of balls 104. In the annular face of the sleeve 103 facing the flange of the hub 105 there are provided spherical recesses 113 for receiving the balls 104.

On the side of the flange of the clutch hub opposite the sleeve 103 there is provided a control ring 115. The control ring 115 has a number of circumferentially spaced recesses 118, corresponding in number to the apertures 114 in the flange of the clutch hub 105. The control ring 115 is held by springs (not shown) acting in the circumferential direction in a position such that the recesses 118 are not in alignment with the apertures 114 or balls 104. On the opposite side of the control ring 115 there is a thrust bearing 109 and a supporting disc 110, through the intermediary of which the control ring is axially biased toward the sleeve 103 by springs 111.

Thus, when the clutch is in its torque transmitting condition, the control ring 115 abuts the balls 104 and holds them in the recesses 113 so that torque can be transmitting between the clutch sleeve 103 and the hub 105.

The control ring 115 is provided with a radially outwardly extending control cam 121 having abrupt square edges and defining a generally radially extending engagement side. The clutch hub 105 has a tapered cam 122. A control member or tappet 120 is radially movable relative to the control ring and hub and is sufficiently large in the axial direction to engage with both the cams 121 and 122.

When it is required to disengage the clutch, the tappet 120 can be moved radially inwardly into the range of movement of the cams 121, 122 which are of course rotating with the other parts of the clutch when it is transmitting torque. When the tappet abuts the cam 121, the effect is to move the control ring 115 against the force of the springs which act circumferentially thereon in such a manner that the recesses 118 are brought into alignment with the balls 104 and the apertures 114 so that the balls 104 may change position from the recesses 113 into the recesses 118. The effect of this is to switch the clutch into its disengaged condition. As this occurs, the cam 122, which continues to turn provided that the clutch hub 105 is the driving member of the clutch, pushes the tappet 120 radially outwardly out of the range of tha cams 121, 122.

This places the clutch in a condition ready to be re-engaged when the speed at which it is driven is reduced. Re-engagement of the clutch, which is described in more detail in British patent application No. 7942173 mentioned above, occurs when the circumferential spring biasing the control ring 115 returns the control ring to its position in which the recesses 118 are not in alignment with the balls 104 or the apertures 114 whereby the balls 104 return from the recesses 118 into the recesses 113.

While a specific embodiment of the invention has been shown and described in detail to illustrate the application of the inventive principles, it will be understood that the invention may be embodied otherwise without departing from such principles.

What is claimed is:

1. An overload clutch assembly comprising: a driving member; a driven member; a plurality of torque transmission members operatively interposed between said driving and driven members; means on one of said driving and driven members defining a plurality of circumferentially spaced apertures for holding in operative position therein said plurality of torque transmission members; means on the other of said driving and driven members defining a first plurality of circumferentially spaced recesses adapted to engage therein said torque transmission members; a circumferentially movable control ring having formed therein a second plurality of circumferentially spaced recesses adapted to receive therein said torque transmission members; spring means urging said control ring against said torque transmission members; said control ring being operable by circumferential movement thereof to a first position to place said clutch assembly into the torque transmitting condition by urging said torque transmission members into said first plurality of recesses and by circumferential movement thereof to a second position to effect disengagement of said clutch assembly by engagement of said torque transmission members into said second plurality of recesses; first cam means on said control ring; second cam means on said driving member; and a control member radially movable into and out of position for engagement with said first cam means; said control member being operable to effect disengagement of said clutch assembly by radial movement thereof into engagement with said first cam means thereby to move said control ring circumferentially to said second position, with said second cam means operating upon engagement thereof with said control member to move said control member radially out of the position where it can engage with said first cam means thereby to allow said control ring to move circumferentially to said first position.

2. An assembly according to claim 1 wherein said first cam means comprises a control cam member having a generally radially extending engagement surface which is brought into engagement with said control member by rotation of said control ring when said control member is moved radially into the path of movement of said control cam member.

3. An assembly according to claim 2 wherein said second means comprises a tapered cam member extending radially beyond said first cam means to effect movement of said control member out of the path of said first cam means.

4. An assembly according to claim 1 wherein said control member is circumferentially spring biased into the clutch-engaged position.

5. An assembly according to claim 1 wherein said clutch assembly operates to return to the clutch-engaged condition upon reduction of the rotating speed thereof below a predetermined speed.

6. An assembly according to claim 1 wherein said first and second cam means are circumferentially aligned with each other when said clutch assembly is in the engaged condition.

7. An assembly according to claim 1 wherein said assembly is brought into the clutch-disengaged condition when said second plurality of recesses are brought into circumferential alignment with said torque transmission members by circumferential movement of said control ring, said control ring operating to urge said torque transmission members into engagement in said first plurality of recesses to maintain said clutch assembly in the clutch-engaged condition where said second plurality of recesses are circumferentially out of alignment with said torque transmission members.

* * * * *